US008129868B2

(12) United States Patent
Cruz (10) Patent No.: US 8,129,868 B2
(45) Date of Patent: *Mar. 6, 2012

(54) SHOCK-PROOF ELECTRICAL OUTLET DEVICES (75) Inventor: Paul Cruz, San Diego, CA (US)

(73) Assignee: International Safety & Development, LLC, El Cajon, CA (US)

(*) Notice: Subject to any disclaimer, the term of this patent is extended or adjusted under 35 U.S.C. 154(b) by 1178 days.

This patent is subject to a terminal disclaimer.

(21) Appl. No.: 11/906,690

(22) Filed: Oct. 3, 2007

(65) Prior Publication Data

US 2008/0122296 A1 May 29, 2008

Related U.S. Application Data (63) Continuation-in-part of application No. 11/542,954, filed on Oct. 3, 2006, now Pat. No. 7,928,609.

(51) Int. Cl.
H02J 11/00 (2006.01)

(52) U.S. Cl. ........................................................ 307/326

(58) Field of Classification Search .................. 307/326, 307/125, 116, 117; 361/2, 42; 335/18
See application file for complete search history.

(56) References Cited

U.S. PATENT DOCUMENTS

| 2,789,255 | A | 4/1957 | Mekler |
|---|---|---|---|
| 2,810,894 | A | 10/1957 | Kerr |
| 2,937,322 | A | 5/1960 | Nixon |
| 3,115,874 | A | 12/1963 | Roberts |
| 3,158,791 | A | 11/1964 | Deneen, Jr. et al. |
| 3,184,651 | A | 5/1965 | Albosta |
| 3,280,375 | A | 10/1966 | Jensen |
| 3,524,133 | A | 8/1970 | Arndt |
| 3,525,903 | A | 8/1970 | Morris et al. |
| 3,621,334 | A | 11/1971 | Burns et al. |
| 3,654,515 | A | 4/1972 | Kato et al. |
| 3,676,738 | A | 7/1972 | Scanlan |
| 3,727,106 | A | 4/1973 | Mendel et al. |
| 3,866,197 | A | 2/1975 | Schweitzer, Jr. |
| 3,870,928 | A | 3/1975 | Allen |
| 3,886,434 | A | 5/1975 | Schreiner |
| 3,974,446 | A | 8/1976 | Schweitzer, Jr. |
| 3,991,366 | A | 11/1976 | Schweitzer, Jr. |
| 4,034,360 | A | 7/1977 | Schweitzer, Jr. |
| 4,042,967 | A | 8/1977 | Yamamoto |
| 4,064,546 | A | 12/1977 | Domanski |
| 4,077,056 | A | 2/1978 | Galiana |
| 4,255,773 | A | 3/1981 | Jabbal |
| 4,410,925 | A | 10/1983 | Tucker et al. |
| 4,414,543 | A | 11/1983 | Schweitzer et al. |
| 4,447,844 | A | 5/1984 | Schossow et al. |

(Continued)

FOREIGN PATENT DOCUMENTS

DE 38 44 176 A1 7/1990

(Continued)

OTHER PUBLICATIONS

Office Action dated Nov. 16, 2009, in U.S. Appl. No. 11/542,954.

(Continued)

Primary Examiner — Albert W Paladini
(74) Attorney, Agent, or Firm — Knobbe Martens Olson & Bear LLP (57) ABSTRACT The present invention relates to a shock-proof electrical output device, which comprises a voltage converter, a current monitoring relay device, a latching relay device, and a changeover relay device.

27 Claims, 5 Drawing Sheets

U.S. PATENT DOCUMENTS

| | | | |
|---|---|---|---|
| 4,706,153 A | 11/1987 | Sainomoto et al. |
| 4,853,821 A | 8/1989 | Lewis |
| 4,888,660 A | 12/1989 | Bartelink |
| 4,947,278 A | 8/1990 | Nichols, III |
| 4,948,044 A | 8/1990 | Cacciatore |
| 5,003,486 A | 3/1991 | Hendel et al. |
| 5,019,935 A | 5/1991 | Nakamura |
| 5,069,632 A | 12/1991 | Avitan |
| 5,151,841 A | 9/1992 | Knights |
| 5,267,116 A | 11/1993 | Avitan |
| 5,347,095 A | 9/1994 | Zeder |
| 5,426,552 A | 6/1995 | Avitan |
| 5,485,340 A | 1/1996 | Avitan |
| 5,737,161 A | 4/1998 | Thomas |
| 5,892,644 A | 4/1999 | Evans et al. |
| 5,920,452 A | 7/1999 | Sullivan |
| 5,923,514 A | 7/1999 | Scott et al. |
| 5,946,180 A | 8/1999 | Simpson |
| 5,988,516 A | 11/1999 | Gilmour |
| 6,049,143 A | 4/2000 | Simpson et al. |
| 6,094,330 A | 7/2000 | Criniti et al. |
| 6,100,607 A | 8/2000 | Olivieri et al. |
| 6,118,639 A | 9/2000 | Goldstein |
| 6,307,482 B1 | 10/2001 | Le Bel |
| 6,548,916 B1 | 4/2003 | Kanazawa et al. |
| 6,552,888 B2 | 4/2003 | Weinberger |
| 6,710,587 B1 | 3/2004 | Reynoso et al. |
| 6,717,781 B2 | 4/2004 | Xu et al. |
| 6,749,456 B1 | 6/2004 | Conner et al. |
| 6,829,124 B2 | 12/2004 | Leopold et al. |
| 6,891,454 B1 | 5/2005 | Naito et al. |
| 6,957,910 B1 | 10/2005 | Wan et al. |
| 7,009,859 B2 | 3/2006 | Chen et al. |
| 7,224,086 B2 | 5/2007 | Germagian et al. |
| 7,400,476 B1 | 7/2008 | Hull, Jr. |
| 7,505,237 B2 | 3/2009 | Baxter |
| 7,928,609 B2 | 4/2011 | Cruz |
| 2002/0097546 A1 | 7/2002 | Weinberger |
| 2003/0007302 A1 | 1/2003 | Gerfast |
| 2005/0128043 A1 | 6/2005 | Ying |
| 2005/0131552 A1 | 6/2005 | Yuan |
| 2006/0232366 A1 | 10/2006 | Li |
| 2008/0049367 A1 | 2/2008 | Carson et al. |
| 2009/0225480 A1 | 9/2009 | Baxter |

FOREIGN PATENT DOCUMENTS

| | | |
|---|---|---|
| EP | 0 348 128 A | 12/1989 |
| EP | 0384881 A1 | 8/1990 |
| EP | 0683927 | 11/1995 |
| JP | 2006/296111 | 10/2006 |
| WO | WO 93/09634 | 5/1993 |
| WO | WO 94/17573 | 8/1994 |
| WO | WO 2008/082636 A1 | 12/2007 |

OTHER PUBLICATIONS

International Search Report and Written Opinion dated Jun. 18, 2007 for International Patent Application No. PCT/US2006/039559, in 10 pages.

International Search Report dated Jan. 10, 2008, for International Patent Application No. PCT/US2007/021367, in 1 page.

International Preliminary Report on Patentability, dated Apr. 7, 2009, including Written Opinion of the International Searching Authority, dated Jan. 10, 2008, for International Patent Application No. PCT/US2007/021367, in 4 pages.

European Office Action dated Sep. 23, 2009 for European Application No. 06 816 635.4, in 5 pages.

Office Action dated Apr. 28, 2010 in U.S. Appl. No. 11/542,954.

FIG. 1

FIG. 2A (No Load)

FIG. 2B

FIG. 3A (No Load)

FIG. 3B

SHOCK-PROOF ELECTRICAL OUTLET DEVICES

CROSS-REFERENCE TO RELATED APPLICATIONS

This application claims priority to U.S. Ser. No. 11/542,954, filed on Oct. 3, 2006, the contents of which are incorporated herein by reference.

FIELD OF THE INVENTION

This invention relates generally to shock-proof electrical output devices, and more particularly to shock-proof electrical output devices that distinguish between an actual electrical load and a false load created, for example, by living beings coming in contact with the electrical output of the device, high voltage being available as output from the device only when an actual electrical load is presented at the output by an electrical device or other source of electrical load.

BACKGROUND OF THE INVENTION

Electrical receptacle outlets in walls and floors present serious hazards to the public. The U.S. Consumer Product Safety Commission (CPSC) estimates that 3,900 injuries associated with electrical receptacle outlets are treated in hospital emergency rooms each year. Approximately a third of these injuries occur when young children insert metal objects, such as hair pins and keys, into the outlet, resulting in electric shock or burn injuries to the hands or fingers, and, in many instances, death. CPSC also estimates that electric receptacles are involved in 5,300 fires annually, which claim, on average, 40 lives and injure 110 consumers. Thus, there is an urgent need to develop a cost-effective and shock proof electrical supply outlet that is able to distinguish an electrical device from a human being to prevent unnecessary physical suffering and death as well as economic losses.

SUMMARY OF THE INVENTION

The present invention provides a shock-proof electrical output device that includes a voltage converter, a current monitoring relay device ($A_R$), a latching relay device ($B_R$), and a changeover relay device ($C_R$).

More particularly, the present invention is an electrical output device having a load and no-load mode comprising: a voltage converter (which may in one embodiment be in the form of a transformer (T) as shown in the drawings); a current monitoring relay device ($A_R$); a latching relay device ($B_R$); a changeover relay device ($C_R$); wherein $B_R$ allows low voltage output from T to flow to $C_R$ only in the load mode; wherein $C_R$ allows high voltage input to flow to $A_R$ only in the load mode; and wherein $A_R$ causes $B_R$ to reset after load is removed from the device.

In one embodiment, the present invention provides a shock-proof electrical output device that includes a power outlet having a positive (G1) and a negative (G2) terminal; a voltage converter with a high voltage input having a positive (T2) and negative (T1) terminal, and a low voltage output having a positive (T3) and negative (T4) terminal; a current monitoring relay device ($A_R$); a latching relay device ($B_R$); and a changeover (i.e., low-to-high voltage/high-to-low voltage) relay device ($C_R$).

The present invention accomplishes the purpose of being a "shock-proof" electrical output device because it includes, in addition to the other components described herein, a latching relay device ($B_R$).

The latching relay device ($B_R$) of one exemplary embodiment of the present invention comprises at least one pair of switching contacts. As exemplified in FIG. 2A, the latching relay device ($B_R$) comprises a first pair of switching contacts (B4 and B5) that together perform the trigger/reset function of the latching relay device $B_R$. The latching relay device ($B_R$) further has at least three or more additional contacts; a first contact (B6), a second contact (B7), and a common contact (B8). The common contact (B8) of the latching relay device is in communication with the low voltage output (T4) of the voltage converter.

Figure 2A:
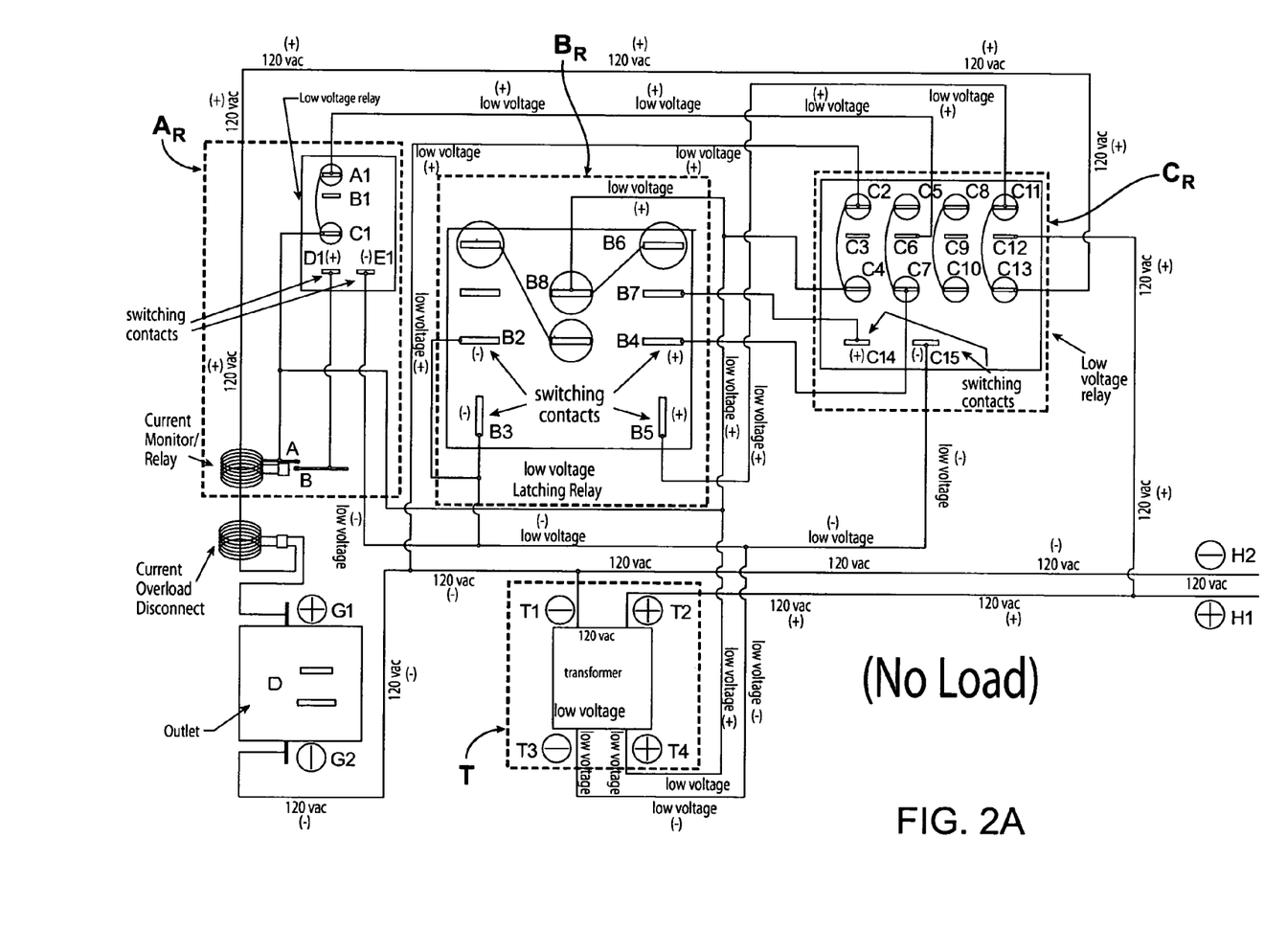
FIG. 2A is an electrical schematic of an embodiment of the shock-proof electrical output device in the no load mode, with a current monitoring relay device $A_R$ that includes a "Reed" type relay.

As exemplified in FIG. 2A, the changeover relay device ($C_R$) of the present comprises at least one pair of switching contacts (e.g., C14 and C15), and at least one set, such as a first set (e.g., C11, C12, and C13), and optionally a second set (e.g, C5, C6 and C7) and a third set (e.g, C2, C3 and C4) of contacts. Each set of contacts has a first contact (e.g., C11 in the first set), a second contact (e.g., C12 in the first set), and a common contact (e.g., C13 in the first set).

In one embodiment as exemplified in FIG. 2A, the current monitoring relay device ($A_R$) comprises a Reed relay with two lever contacts A and B, a first contact (A1), a second contact (B1) and a common contact (C1). The first contact (C1) of the first set of contacts of the changeover relay device ($C_R$) is in communication with the first switching contact (B5) of the latching relay device ($B_R$), the second contact (C12) is in communication with a source of high voltage such as the positive terminal of a high voltage power line, and the common contact (C13) is in communication with the positive terminal (G1) of the outlet. The second contact (C6) of the second set of contacts of the changeover relay device ($C_R$) is in communication with the first contact (A1) of the current monitoring relay device ($A_R$) and the common contact (C7) is in communication with the second switching contact B4 of the latching relay device ($B_R$). The first contact (C2) of the third set of contacts of the changeover relay ($C_R$) receives high voltage input (such as when it is in communication with the negative terminal of a high voltage power line) and the common contact (C4) is in communication with the positive low voltage output terminal (T4) of the voltage converter. The switch (C14) of the changeover relay device ($C_R$) is in communication with the second contact of the latching relay device.

In another embodiment, the current monitoring relay device is a transformer with a high voltage input and low voltage output. The high voltage input is in communication with the positive terminal of the power outlet.

The output device of the present invention may also include a current overload protection circuit, such as the current overload disconnect depicted in FIG. 2A.

In an alternative embodiment of the present invention, the shock proof electrical output device comprises a control relay that functions as both a latching relay and a changeover relay, instead of having a separate latching relay and changeover relay.

The shock-proof electrical output device may have a variety of applications, such as use in a circuit breaker box, an outlet box (power supply strip), and an extension cord, etc.

BRIEF DESCRIPTION OF THE DRAWINGS

The accompanying drawings illustrate the present invention. In such drawings.

DETAILED DESCRIPTION OF THE INVENTION

The present invention provides a shock-proof electrical output device that includes a voltage converter, a current monitoring relay device ($A_R$), a latching relay device ($B_R$), and a changeover (i.e., low-to-high voltage/high-to-low voltage) relay device ($C_R$).

The following terms have well known meanings as would be understood by anyone of ordinary skill in the electrical arts. The discussion below is included herein for reference and not by way of limitation.

A "voltage converter" changes the voltage from a power source, such as a high voltage power line, to a useable (low voltage) power supply. When the power source is in the form of an alternating current, the voltage converter can be, for example, a transformer (T) that transforms the high voltage power from the source to a low voltage current.

A "current monitoring relay device" ($A_R$) monitors the voltage of incoming current, transforms it into a lower voltage form, and transmits it as low voltage current output.

A "latching relay device" ($B_R$) toggles between two different configurations or "states", and is considered to be "bistable". In a two-coil latching relay, when current is applied to one coil, the relay "latches" in one state and stays in that state until voltage is applied to the other "unlatch" coil. Accordingly, when the current is switched off, the relay remains in its last state. This type of relay has the advantage that it consumes power only for an instant, while it is being switched, and it retains its last setting across a power outage.

A "changeover relay device" ($C_R$), which can also be referred to as a "low-to-high/high-to-low voltage relay", has one common contact and two fixed contacts. One of these fixed contacts is "normally closed" (NC) when the relay is switched off, and the other is "normally open" (NO). Switching the relay on causes the normally open contact to close and the normally closed contact to open.

The "relays" as described herein and depicted in the Figures may be, for example, "Reed" relays, "Solid State" relays or "Coil" relays. "Reed" relays are electrically-operated (electro-mechanical, or electro-magnetic) switching devices that consist of two thin, magnetic strips (reeds or levers) encapsulated in a glass envelope. "Solid State" relays are also referred to as "semiconductor relays". "Coil" relays are another form of electrical relay that utilize a coil surrounding a core to employ magnetic attraction/repulsion to draw contacts together. $A_R$ is depicted as a "Reed" relay in FIGS. 2A and 2B, and as a "Coil" relay in FIGS. 3A and 3B.

As used herein, "high voltage" refers to voltages in a range of approximately to 30 VAC to 600 VAC (intended to encompass all voltages employed to power various electrical appliances from electrical outlets inside and outside of residences and commercial buildings throughout the world), while "low voltage" refers to voltages in the range of just above zero up to 30 V, the low voltages being either DC or AC. Human beings present very high (in the megaohms) resistance when grasping wires with the fingers of dry hands (the resistance becoming somewhat less when the fingers are sweaty or bloody). Therefore, at the low voltages present at the outlet in the electrical output device of this invention when no electrical draw from an electrical appliance in use, no appreciable current will flow through a human in contact with the outlet of the invention in the low-voltage, no-load mode.

This can most readily be appreciated by noting that Ohm's law (V=IR), in which V represents voltage, I represents current, and R represents resistance (or impedance), can be manipulated to give I=V/R. Thus, given the low voltage present at the shock-proof outlet of the electrical output device of the instant invention in the no load mode, combined with the above-mentioned fact that a human being inherently present comparatively high resistance or impedance (even when grasping wires with sweaty or bloody fingers) as compared to the virtually zero impedance presented by an electrical appliance in use, means that the current (the ratio of voltage to impedance) will not be large enough to harm a human being in contact with the shock-proof outlet of the instant invention. Therefore, at most, truly negligible (i.e., virtually imperceptible) currents will flow through the human, certainly not currents in the double digit milliamps (or higher) that can present an electrocution hazard.

Figure 1:
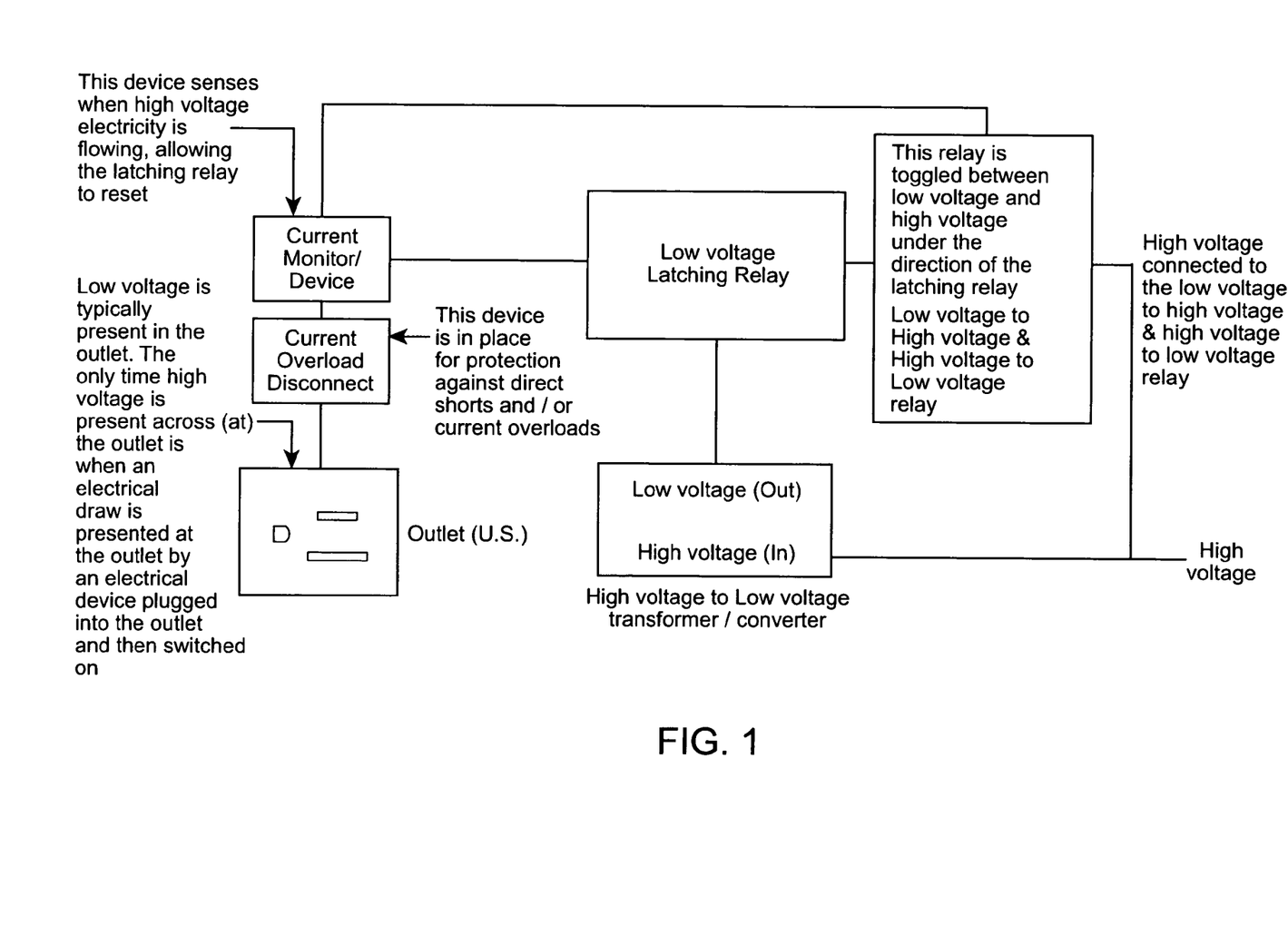
FIG. 1 is a block diagram schematic of the shock-proof electrical output device that includes explanatory text.

In one embodiment of the present invention as depicted in FIG. 1, the output device includes: a power outlet, a voltage converter shown as a transformer (T), a current monitoring relay device ($A_R$), a latching relay device ($B_R$), and a changeover relay device ($C_R$) (low voltage to high voltage, and high voltage to low voltage relay). Another suitable type of voltage converter not referred to in the Figures is a solid-state, step-down voltage converter.

Turning now to FIGS. 2A to 3B, the elements depicted in the Figures (and labeled in FIG. 2A) are described below and listed in the following table:

TABLE 1

Description of Figure Elements

| Device Component | Element | Description |
| --- | --- | --- |
| Power Outlet | G1 | Positive terminal |
|  | G2 | Negative terminal |
| Transformer-Type Voltage Converter (T) | T1 | Negative input terminal |
|  | T2 | Positive input terminal |
|  | T3 | Negative output terminal |
|  | T4 | Positive output terminal |
| Changeover Relay Device ($C_R$) | C14 and C15 | Switching contacts |
|  | C11, C12, C13 | Exemplary first set of contacts |

TABLE 1-continued

Description of Figure Elements

Figure 2B:
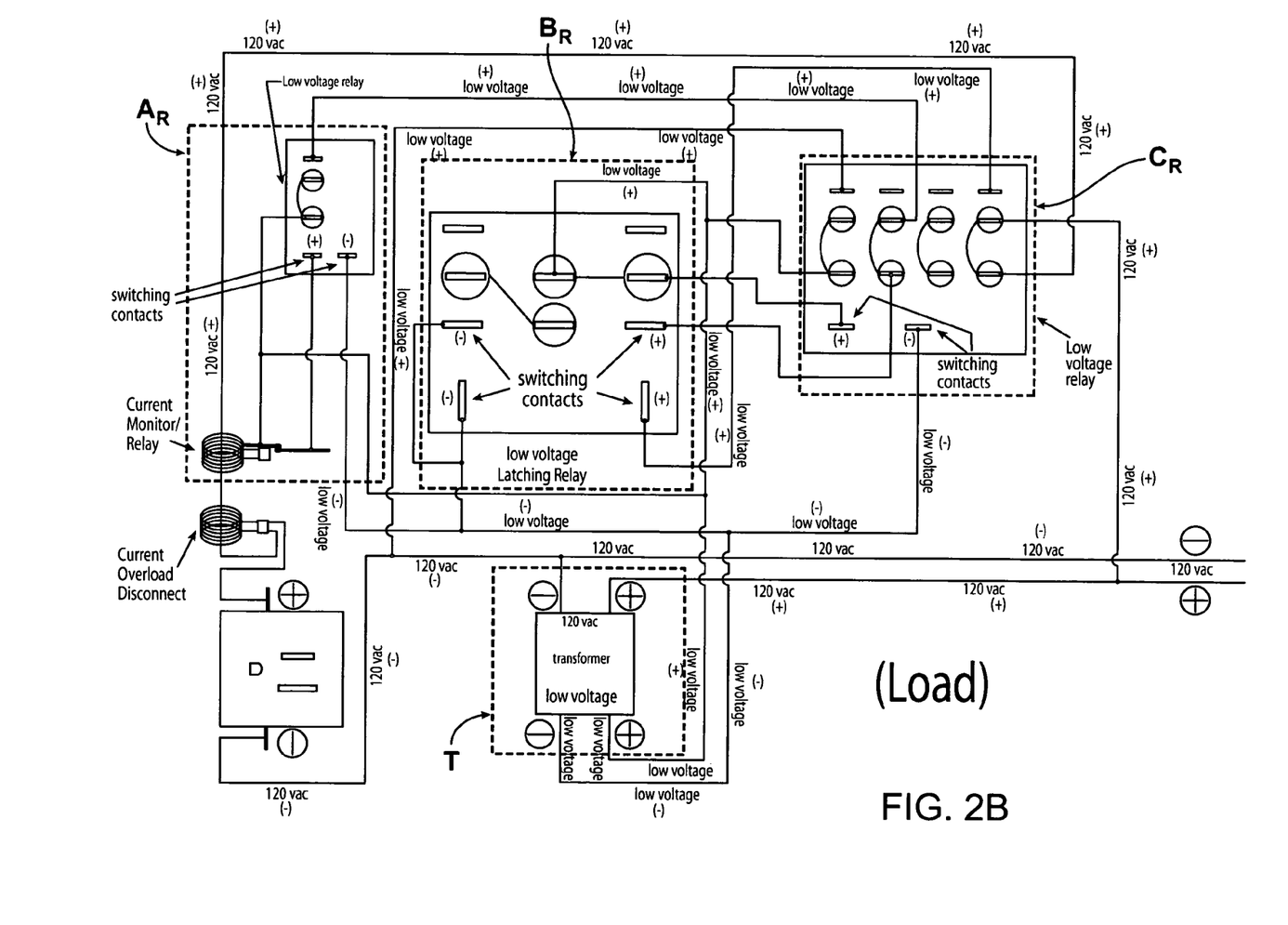
FIG. 2B is an electrical schematic of the embodiment of the shock-proof electrical output device depicted in FIG. 2A in the load mode.
Figure 3A:
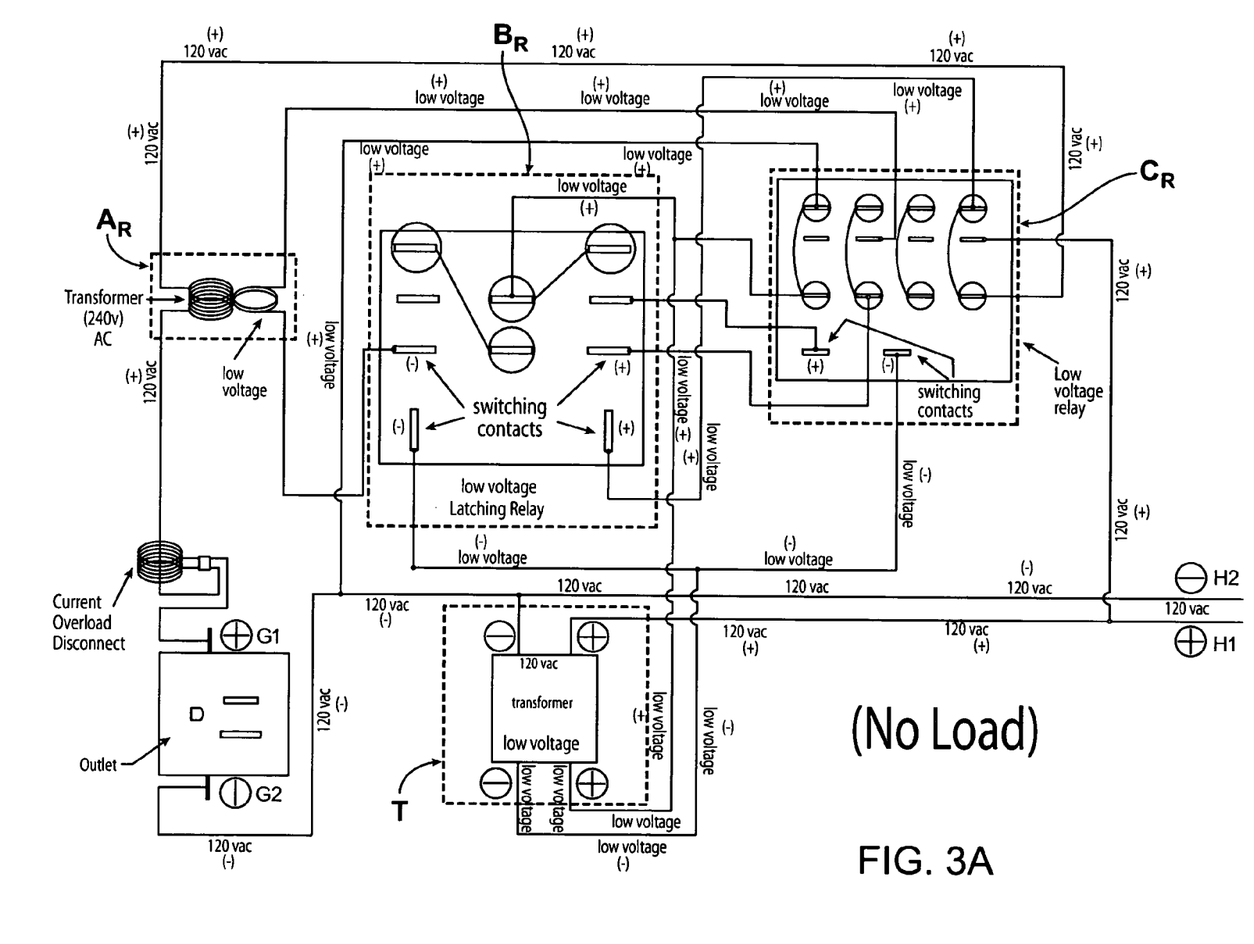
FIG. 3A is an electrical schematic of an embodiment of the shock-proof electrical output device in the no load mode, with a transformer as the current monitoring relay device $A_R$.

| Device Component | Element | Description |
|---|---|---|
| | C8, C9, C10 | Set of contacts that are not employed (i.e., they are unconnected) |
| | C5, C6, C7 | Second optional set of contacts |
| | C2, C3, C4 | Third optional set of contact |
| | C13, C10, C7, C4 | Common contacts |
| | C11/C12, C8/C9, C5/C6, C2/C3 | Pairs of contacts that are either in communication with or not in communication with the common contacts in the same set in the load or no-load mode |
| | C11, C8, C5, C2 | The first contacts in the pair of contacts in communication with the common contacts in the set in the no-load mode |
| | C12, C9, C6, C3 | The second contacts in the pair of contacts in communication with the common contacts in the set in the load mode |
| Latching Relay Device ($B_R$) | B2 and B4 | The negative and positive contacts, respectively, in the first coil of |
| | B3 and B5 | The negative and positive contacts, respectively, in the second coil of a two-coil latching relay device |
| | B4/B5 | The trigger/reset pair of contacts that function as the switching contacts to toggle the latching relay device indirectly between states via the changeover relay device in the embodiments depicted in FIGS. 2A/2B, 6A/6B, and 7A/7B |
| | B2/B3 | The trigger/reset pair of contacts that function as the switching contacts to toggle the latching relay device directly between states in the embodiments depicted in FIGS. 3A/3B, 4A/4B, and 5A/5B |
| | B8 | The common contact between B6/B7 |
| | B6/B7 | The pairs of contacts that toggle between being in communication with or not in communication with the common contact (B8) in the load (B7) or no-load (B6) mode |
| Current Monitoring Relay Device ($A_R$)* | C1 | The common contact between A1/B1 |
| | A1/B1 | The pair of contacts that are either in communication with or not in communication with the common contact in the load (B1) or no-load (A1) mode |
| | D1 and E1 | Switching contacts |
| | A and B | The lever contacts that are disconnected in the no-load mode and connected in the load mode |

*In FIGS. 2A/2B, the current monitoring relay device ($A_R$) consists of a latching relay and a separate current monitor. In FIGS. 3A/3B, the current monitoring relay device ($A_R$) consists of a current converting two-coil transformer.

In operation, the shock-proof electrical output device, such as the device depicted in FIGS. 2A and 2B, has two different modes: a no-load mode (FIG. 2A) and load mode (FIG. 2B). As shown in these Figures: the current monitoring relay device ($A_R$) has a single coil (not shown) having switching contacts D1(+)/E1(−); the latching relay device ($B_R$) has two coils (not shown) having switching contacts B5 (+) and B3 (−) in one coil, and B4(+)/B2(−) in the other coil; and $A_R$ has a single coil (not shown) having switching contacts C14(+)/C15(−).

In a no-load mode, the transformer (T) (which serves as the voltage converter in the embodiment depicted in these two Figures) is energized at all times by high voltage (H1 and H2). From transformer (T), low voltage current is connected via the negative low voltage terminal (T3) to C15, B2, B3, and E1 (i.e., the negative switching contacts) to supply them with low voltage power at all times in the no-load mode.

Also, from transformer (T), low voltage current is connected via the positive low voltage terminal (T4) to: A (one of the two lever contacts) and C1 (the common contact) of the current monitoring relay device $A_R$; the common contact C4 of the third set of contacts in the changeover relay device $C_R$; and the common contact B8 of the latching relay device $B_R$. Accordingly, positive low voltage is connected to the common contacts (or in the case of the changeover relay device ($C_R$), at least one common contact (C4)) at all times in the no-load mode.

When an electrical device is plugged into outlet, such as an electrical tool or an appliance, the electrical device serves to connect the positive terminal (G1) and the negative terminal (G2) of the power outlet. More particularly, low voltage electricity passes through the power outlet, into and out of the electrical device, and back to the power outlet.

When the outlet encounters an electrical load from the electrical device (such as, when it is turned "on", or when an "off" button or "safety/trigger switch" is released), the electrical device serves as a "switch" to allow current to flow from G2 to G1 via a path that extends the path from G1 all the way to T4, since T4 is connected to C4, which is connected to C2 in the same set of contacts in the changeover relay ($C_R$), which connects to G2, and through the electrical device to G1. From there, the current makes its way from C13 to C11 (i.e. the common connection that is connected to the first connection in the first set of switching contacts), and then from C11 to B5, which energizes $B_R$.

Once switching contact B5 in the first coil of the latching relay device ($B_R$) receives current (i.e., once $B_R$ is energized, the latching relay ($A_R$) "toggles", i.e., the connection between B8 and B6 is broken, and a connection between B8 and B7 is formed. Current then flows through B7. This allows positive low voltage from terminal T4 to pass through B7 to switching contact C14, which in turn energizes $C_R$. As a result, the connection in each of the sets of switching contacts shifts from the common contact and the first contact to the common contact and the second contact. In other words the connection of C4 is switched from C2 to C3, the connection of C7 is switched from C5 to C6, and the connection of C13 is switched from C11 to C12. (In the embodiment depicted in FIGS. 2A and 2B, the set of contacts that consists of contacts C8, C9 and C10 are not in operation.) As such, the connection between C12 and C13 allows positive high voltage power from the high voltage power source H2 to pass to the positive terminal G1 of the outlet. The current flowing through to G1 also energizes the current monitor relay ($C_R$) by causing an electromagnetic pulse to flow to lever contact A that effects a connection to lever contact B.

Thus, positive low voltage is provided to and energizes the current monitoring relay device ($A_R$). This causes A1 to be disconnected from the common contact, C1, and causes a connection to be formed between C1 and B1. Now, the high voltage current flow through the electrical device and the shock-proof outlet is in the load mode.

When load is removed from the outlet (e.g., the on/off switch of the appliance is turned to the off position or the user lets go of the trigger switch completely), the current monitor relay device ($A_R$) no longer supplies the electromagnetic forces necessary to form a connection between lever contacts A and B, and they become disconnected, which deenergizes $A_R$. When $A_R$ is deenergized, C1 connects back to A1, which allows low voltage power to flow through $A_R$ from C1 to A1. When this happens, C6 connects to C7, which connects to B4 (the positive switching contact in the second coil of the latching relay ($B_R$)), which energizes the $B_R$ latching relay. This toggles the connection between B8 and B7 back to a connection between B8 and B6, which represents the original configuration of the latching relay. When this happens, C2 connects again to C4, C5 connects to C7, etc. In other words, the device assumes its original no-load configuration, with only low voltage present at the outlet.

Figure 3B:
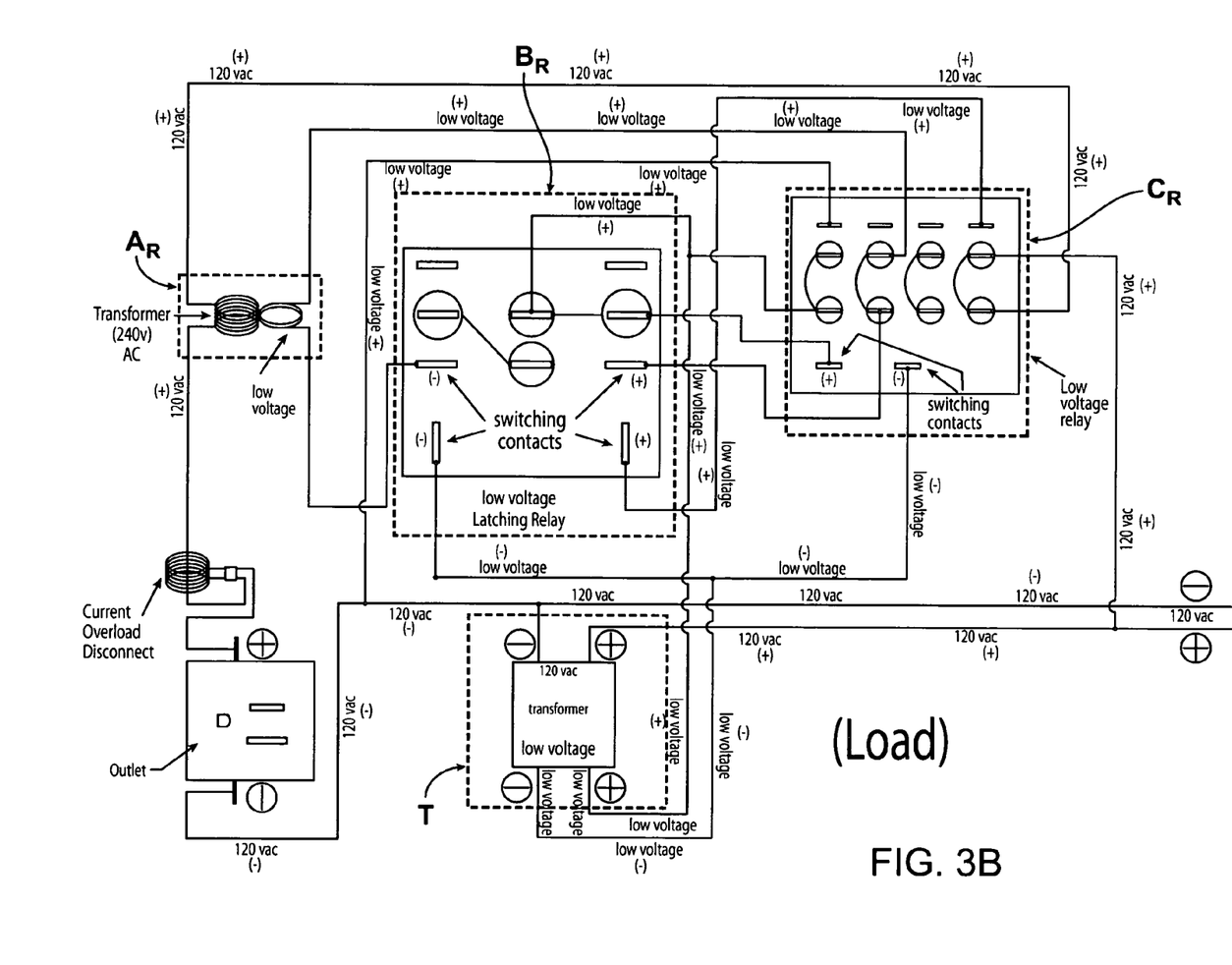
FIG. 3B is an electrical schematic of the embodiment of the shock-proof electrical output device depicted in FIG. 3A in the load mode.

FIGS. 3A and 3B are electrical schematics of an embodiment of the shock-proof electrical output device in the no load mode (3A) and the load mode (3B), wherein the current monitoring relay device ($A_R$) is a transformer-type device. This embodiment functions just as described above for FIGS. 2A and 2B, except that the current monitoring relay device $A_R$ is a transformer, and serves only a relaying, voltage step-down function, and does not operate by way of a switching relay. In other words, when a device is plugged into the outlet and turned on, the result in current appears as a low voltage current, which resets the low voltage latching relay to reflect the high current (on) condition. Also, as depicted in these two figures the latching relay ($B_R$) is energized via the negative switching contacts, rather than the positive switching contacts.

The examples set forth above, in both the specification and the figures, are provided to give those of ordinary skill in the art with a complete disclosure and description of how to make and use the preferred embodiments of the present invention, and are not intended to limit the scope of what the inventors regard as their invention. Modifications of the above-described modes for carrying out the invention that are obvious to persons of skill in the art are intended to be within the scope of the following claims. All publications, patents, and patent applications cited in this specification are incorporated herein by reference as if each such publication, patent or patent application were specifically and individually indicated to be incorporated herein by reference.

What is claimed is:

1. A device having a low voltage current output no-load mode and a high voltage current output load mode, the device comprising:
    an outlet having a positive terminal and a negative terminal;
    a latching relay comprising a first switching contact and a second switching contact, the latching relay being configured to switch from a first state to a second state when the first switching contact is energized and configured to switch from the second state to the first state when the second switching contact is energized, wherein the latching relay is further configured to provide a low voltage current output when the first switching contact is energized;
    a changeover relay comprising a third switching contact connected to the latching relay, the changeover relay being electrically connected to the outlet and configured, in the no-load mode, to receive low voltage current that flows across the outlet and provide the received low voltage current to the latching relay first switching contact, the changeover relay also being configured to switch the device from the no-load mode to the load mode when the third switching contact is energized by the low voltage current output from the latching relay, and wherein the changeover relay is further configured to receive a high voltage power input and connect the high voltage power to the outlet in the load mode; and
    a current monitoring relay configured to provide low voltage power to energize the latching relay second switching contact when a load is removed from across the positive terminal and negative terminal.

2. The device of claim 1, further comprising a voltage converter configured to convert a high voltage input from a high voltage power source into a low voltage output.

3. The device of claim 2, wherein the low voltage output is provided to the outlet when the device is in the no-load mode, and wherein the high voltage input is provided to the outlet when the device is in the load mode.

4. The device of claim 1, wherein the voltage converter comprises a transformer.

5. The device of claim 1, wherein the latching relay comprises two coils having the first and second switching contacts, or wherein the changeover relay comprises a coil having the third switching contact.

6. The device of claim 1, wherein the current monitoring relay comprises a fourth switching contact, the current monitoring relay being configured to output the low voltage power except when the fourth switching contact receives a current.

7. The device of claim 6, wherein the latching relay is configured to switch from the second state to the first state to stop providing the low voltage current output to the changeover relay in response to receiving the low voltage power from the current monitoring relay, and wherein the changeover relay is configured to switch the device from the load mode to the no-load mode when the low voltage current output from the latching relay to the third switching contact is stopped.

8. The device of claim 6, wherein the current monitoring relay further comprises a first lever contact and a second lever contact, the first and second lever contacts being configured to connect in response to an electromagnetic pulse, wherein the current received by the fourth switching contact flows through the connection of the first and second lever contacts.

9. The device of claim 6, further comprising four additional switching contacts, each of the four additional switching contacts being paired with a different one of the first, second, third, or fourth switching contacts, wherein the first, second, third, and fourth switching contacts are configured to energize when receiving a positive low voltage, and wherein the four additional switching contacts are supplied with a negative low voltage when the device is in the no-load mode.

10. The device of claim 1, wherein the changeover relay further comprises three pairs of contacts, each pair comprising a common contact, a normally open contact, and a normally closed contact, the common contact and the normally closed contact of each pair being connected when the changeover relay is in a first configuration, and the common contact and normally open contact of being connected when the changeover relay is in a second configuration,
wherein a first of the common contacts and a first of the normally closed contacts provide connection between a low voltage output by a transformer and the outlet,
wherein a second of the common contacts and a second of the normally open contacts provide connection between a low voltage output by the current monitoring relay and the latching relay,
wherein a third of the common contacts and a third of the normally closed contacts provides a connection between the outlet and the first switching contact,
wherein the third of the common contacts and a third of the normally open contacts provides a connection between a high voltage source and the outlet, and
wherein the changeover relay is configured to switch from the first configuration to the second configuration when the third switching contact receives the electrical output from the latching relay.

11. The device of claim 10, wherein the latching relay further comprises a common contact, a first contact, and a second contact, wherein the first state comprises the common contact and the first contact being connected and the second state comprises the common contact and the second contact being connected, the connection between the common contact and the second contact in the second state allowing the low voltage output by the transformer to flow through the latching relay to the third switching contact.

12. The device of claim 1, wherein the current monitoring relay comprises a transformer configured to step-down a supplied voltage.

13. The device of claim 12, wherein the latching relay further comprises a first negative switching contact paired with the first switching contact, and a second negative switching contact paired with the second switching contact, the latching relay configured to switch between the first state and the second state when at least one of the first and second negative switching contacts is energized.

14. The device of claim 1, wherein the changeover relay comprises a low-to-high/high-to-low voltage relay.

15. The device of claim 1, further comprising a current overload disconnect connected between the outlet and the current monitoring relay.

16. An electrical output device having sets of selectively connectable contacts, each set of selectively connectable contacts comprising a first contact, a second contact, and a common contact, the device comprising:
an outlet having a positive terminal and a negative terminal;
a voltage converter comprising a high voltage input and a low voltage output;
a current monitoring relay comprising a first set of selectively connectable contacts and a first pair of switching contacts, wherein the common contact and the first contact of the first set are connected except when the first pair of switching contacts is energized, and wherein the common contact and the second contact of the first set are connected otherwise;
a latching relay comprising a second set of selectively connectable contacts and a second and third pair of switching contacts, wherein the common contact and the first contact of the second set are connected when the second pair of switching contacts is energized, and wherein the common contact and the second contact of the second set are connected when the third switching contact is energized; and
a changeover relay comprising a third, fourth, and fifth set of selectively connectable contacts and a fourth pair of switching contacts, wherein the common contacts and the first contacts of the third, fourth, and fifth sets are connected except when the fourth pair of switching contacts is energized, and wherein the common contact and the second contact of the third, fourth, and fifth sets are connected otherwise,
wherein the low voltage output and the third switching contact are connected when a load is placed across the outlet,
wherein the low voltage output and the fourth switching contact are connected through the latching relay when the third switching contact is energized, and
wherein a high voltage power source and the outlet are connected through the changeover relay when the fourth switching contact is energized.

17. The electrical output device of claim 16, wherein the first switching contact is energized when the load is present across the outlet, and wherein the low voltage output and the second switching contact are connected when the load is removed.

18. The electrical output device of claim 17, wherein the low voltage output and the outlet are connected through the changeover relay when the second switching contact is energized.

19. An electrical safety device, for connection between a high voltage electrical power source and an outlet, the device comprising:
means for converting a high voltage from the electrical power source to a low voltage;
a first relay comprising means for monitoring the voltage of current provided to the outlet and for providing a low voltage current output in the absence of a load being placed across the outlet;
a second relay comprising means for receiving the high voltage and the low voltage and for selectively outputting the high voltage to the outlet; and
a third relay comprising means for toggling the receiving and outputting means to stop outputting the high voltage when the low voltage current output is received at the toggling means from the monitoring means.

20. The device of claim 19, wherein the toggling means is configured to toggle the receiving and outputting means to start outputting the high voltage when a current is received at the toggling means from a load placed across the outlet.

21. The device of claim 20, wherein the high voltage is provided to the outlet only when a load is placed across the outlet, and wherein the low voltage is provided to the outlet otherwise.

22. The device of claim 20, wherein the low voltage current received by the toggling means and the current received from a load placed across the outlet by the toggling means pass through the receiving and outputting means before being received by the toggling means.

23. The device of claim 19, wherein the high voltage is in a range of approximately 30 VAC to approximately 600 VAC, and wherein the low voltage is in a range being more than zero and less than approximately 30 volts DC or AC.

24. The device of claim 19, wherein the converting means comprises a transformer.

25. The device of claim 19, wherein the first relay comprises a current monitoring relay device.

26. The device of claim 19, wherein the second relay comprises a changeover relay device.

27. The device of claim 19, wherein the third relay comprises a latching relay device.

* * * * *